(12) United States Patent
Gourjon

(10) Patent No.: US 7,581,459 B2
(45) Date of Patent: Sep. 1, 2009

(54) DEVICE FOR TRANSPORTING PARTS FOR SUPPLYING MACHINES

(76) Inventor: Didier Gourjon, 245 chemin des Quarts, Villaz (FR) 74370

( * ) Notice: Subject to any disclaimer, the term of this patent is extended or adjusted under 35 U.S.C. 154(b) by 772 days.

(21) Appl. No.: 10/482,632

(22) PCT Filed: Jun. 24, 2002

(86) PCT No.: PCT/FR02/02185

§ 371 (c)(1),
(2), (4) Date: Sep. 20, 2004

(87) PCT Pub. No.: WO03/002435

PCT Pub. Date: Jan. 9, 2003

(65) Prior Publication Data

US 2005/0028621 A1 Feb. 10, 2005

(30) Foreign Application Priority Data

Jun. 27, 2001 (FR) .................................. 01 08450

(51) Int. Cl.
*F16H 25/14* (2006.01)
*B65G 27/12* (2006.01)

(52) U.S. Cl. ...................................... 74/55; 198/750.8

(58) Field of Classification Search ...................... 74/55; 198/750.8, 756, 757, 759, 766
See application file for complete search history.

(56) References Cited

U.S. PATENT DOCUMENTS

| 2,991,872 | A |   | 7/1961  | Keegan        |          |
|-----------|---|---|---------|---------------|----------|
| 4,362,455 | A |   | 12/1982 | Hirose        |          |
| 4,724,949 | A |   | 2/1988  | Misina        |          |
| 5,178,258 | A | * | 1/1993  | Smalley et al. | 198/750.8 |
| 6,708,815 | B2 | * | 3/2004  | Kato          | 198/750.8 |

FOREIGN PATENT DOCUMENTS

FR 2379454 9/1978

* cited by examiner

*Primary Examiner*—William C Joyce
(74) *Attorney, Agent, or Firm*—Fay Sharpe LLP

(57) ABSTRACT

A device for transporting parts (1) includes a transporting member (3) whereon the parts to be transported (2) are to be arranged. The transporting member (3) is mounted mobile relative to a frame (9) of the device for reciprocating movement, which occurs in a plane (P) in which the parts are transported. A driving device comprises at least a drive cam (4) co-operating with at least a roller that is displaced with the transporting member, so that the movement in the plane is a reciprocating translational movement generated by the rotation of the drive cam (4).

10 Claims, 8 Drawing Sheets

DEVICE FOR TRANSPORTING PARTS FOR SUPPLYING MACHINES

BACKGROUND OF THE INVENTION

The present invention concerns a device for transporting parts for supplying machines intended to permit supply of machine parts, or in general intended to ensure the transport of all types of parts in industrial process.

At the present time, several kinds of appliances are known which are intended for the transport of parts and notably devices intended for the supply of machines. Common transport devices include conveyor belt devices formed by a belt or a band driven by rollers or by vibrating rail type devices generally called vibratory type devices.

The conveyor belt devices present drawbacks with respect to occupation of space which renders installation not possible in a great number of situations. They also present certain drawbacks strictly connected with the piecemeal supply of parts, in other words, with the transition which takes place at the end of the band between the conveyor belt and the supplied machine.

The vibratory devices operate on a relatively simple principle which consists of alternatively displacing the rail axially while separating the transported pieces in the air pending return of the rail to its former position. Thus, these vibratory units present oscillating movements with a vertical component destined to cause separation of pieces and horizontal components by axial displacement of the rail. In said manner, the pieces remain in contact with the rail only during its axial displacement towards the front. These vibratory rails, however, present numerous drawbacks related to their design and their utilization. In fact, they do not permit transport of parts at rapid rates and are therefore limited to certain applications. Moreover, certain parts to be transported are fragile and are therefore susceptible to being damaged during their displacement along the rail by repeated shocks due to the vertical oscillations of said rail. In addition, certain pieces can no longer be transported by such rails by reason of their shape. In fact, very fine pieces will overlap and become jammed during the course of their travel; moreover, very heavy pieces require powerful vibratory units, which would interfere with the operation of the rest of the machine. Also, these vibrating rail appliances present the disadvantage of being able to transport the pieces in only one direction, in contrast to the conveyor belt devices, and they also present problems in exiting from rail with certain parts possibly being encountered in the overhang with the risk of being damaged by longitudinal rail end deflection.

Consequently, it is the objective of the present invention to resolve the aforementioned drawbacks of parts supply devices with the aid of simple, reliable means which are not expensive and which are easily implemented. The invention proposes a parts supply device which permits rapid transport of parts, which tends to function in both directions, which is capable of transporting fragile pieces and light-weight parts, while occupying little space, and which facilitates its adaptation to different situations encountered in the industrial process.

SUMMARY OF THE INVENTION

According to its principal characteristic, the device for transporting parts comprises a transporting member on which the parts to be transported are intended to be arranged. The transporting member is mounted mobile relative to a frame of the device for reciprocating movement in the plane in which the parts are transported by a driving device. The driving device comprises at least a drive cam, co-operating at least with a roller, which is an integral part of the transporting member, to provide it with its movement.

According to a preferred embodiment of the device for transporting parts according to the invention, the transporting member is a longitudinal rail whose movement in the plane of displacement of the parts is a reciprocating translational movement, generated by the rotation of the drive cam.

According to another embodiment of the device for transporting parts according to the invention, the transporting member is a rail having a round shape, either circular or spiral, whose movement in the plane of displacement of parts is a reciprocating translational movement generated by the rotation of the drive cam.

According to a complementary characteristic of the device for transporting parts according to the invention, it is characterized in that the transporting member is carried by a rail support which carries a roller which drives the parts in translational movement according to the longitudinal displacement axis when it co-operates with the rotary cam.

According to another characteristic of the device for transporting parts according to the invention, it is characterized in that it comprises a motorized device which drives the cam to rotate around its axis of revolution the rotation of the cam due to the specific shape of its contact surface, causes the alternative longitudinal displacement of the rail support by co-operating with the roller.

According to the preferred embodiment of the device for transporting parts, the axis of rotation of the cam and the axis of rotation of the drive roller are parallel.

According to another characteristic of the device for transporting parts according to the invention, it is characterized in that the cam presents an involute rounded surface which comprises: (1) a first zone called acceleration zone, which is very short, then (2) a zone called advancement zone, where the radius of the cam increases in constant manner over its angular sector, then (3) a brief deceleration zone, in front of (4) a zone called "draw-back", where the radius decreases.

According to a complementary characteristic of the device for transporting parts, the forward movement of the rail corresponding to the acceleration zone, the forward advancement zone and deceleration zone of the involute surface represents an angular sector of the cam comprising between 200° and 300° whereas the zone called the "draw-back" zone represents an angular sector comprising between 60° and 160°.

According to an embodiment of the device for transporting parts according to the invention, when the cam travels one complete turn, the roller and thus the rail undergo a forward movement corresponding to the acceleration zone, the forward advancement zone and the deceleration zone of the cam during approximately two thirds of turn, then a very abrupt "draw-back" movement during the last third of the turn. This movement of the rail permits—thanks to the acceleration zone—rapid adjustment of the rail to the relative parts displacement rate (in regard to the frame) and to accelerate same again before moving at a constant rate during the forward advancement zone, and to then let them slide during the braking or deceleration zone, followed by the rail "draw-back" which takes place quickly before commencement of another cycle.

According to a complementary characteristic of the device for transporting parts, the rotary cam is controlled by a motorized device which permits its rotation in both directions according to the user's choice.

According to another embodiment, the cam is sandwiched between two rollers, while said cam is composed of two superposed cams, a first cam or upper cam, with which a first roller 6a cooperates, and a second cam or lower cam, with which a second roller co-operates.

Further advantages will be apparent upon reading the following detailed description.

BRIEF DESCRIPTION OF THE DRAWINGS

Other characteristics and benefits of the invention are apparent from the description which follows in regard to the attached drawings, which are provided by way of example only and are not limited thereto.

FIGS. 1 to 6 depict a first embodiment of the device for transporting parts according to the invention.

FIG. 1 represents the device in perspective.

FIG. 3 represents an exploded view of the transport device.

FIG. 4 presents a sectional view of the rail mechanism.

FIG. 5 illustrates the pivoting cam, viewed from below.

FIG. 6 shows a schematic representation of the contact surface of the cam, depicting effective cam radius versus angle around its circumference.

FIG. 7 is an exploded perspective view similar to FIG. 3.

FIG. 8 is a lateral sectional view.

FIG. 9 is an illustration seen from above, depicting the cams and the rollers.

FIG. 10 is a perspective view showing the cams and the rollers.

DETAILED DESCRIPTION OF THE PREFERRED EMBODIMENT

Figure 1:
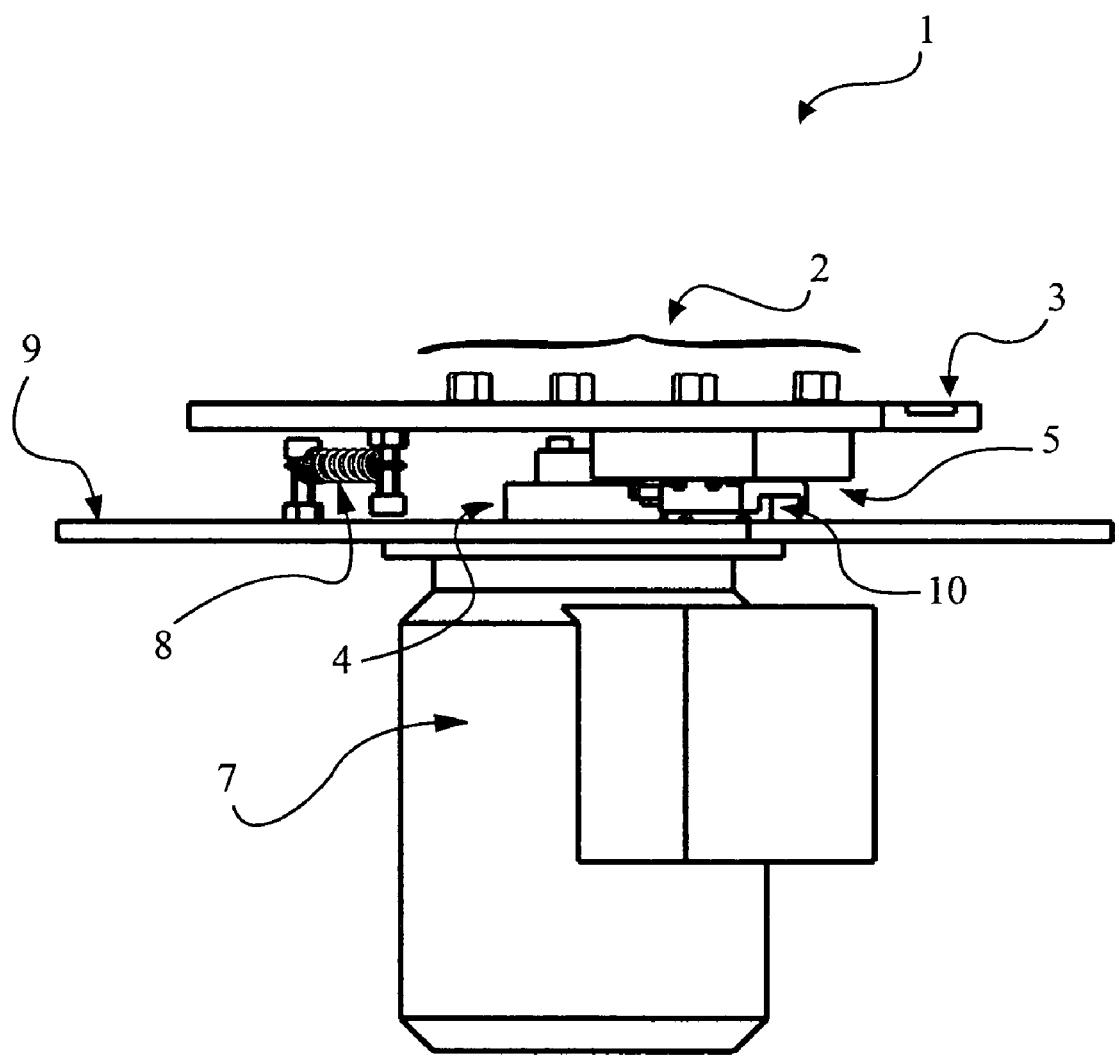
Figure 2A:
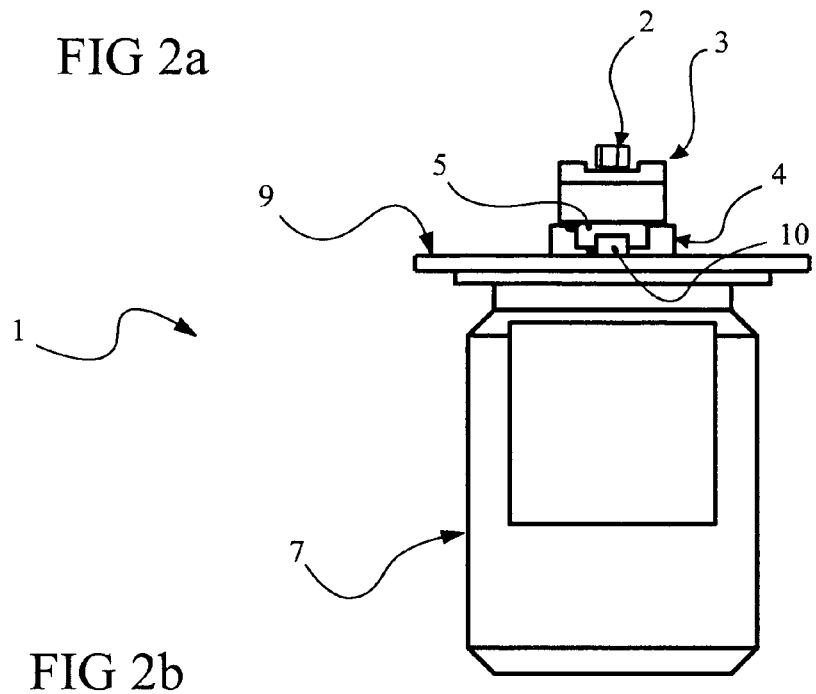
FIG. 2a represents the device in lateral view.
Figure 2B:
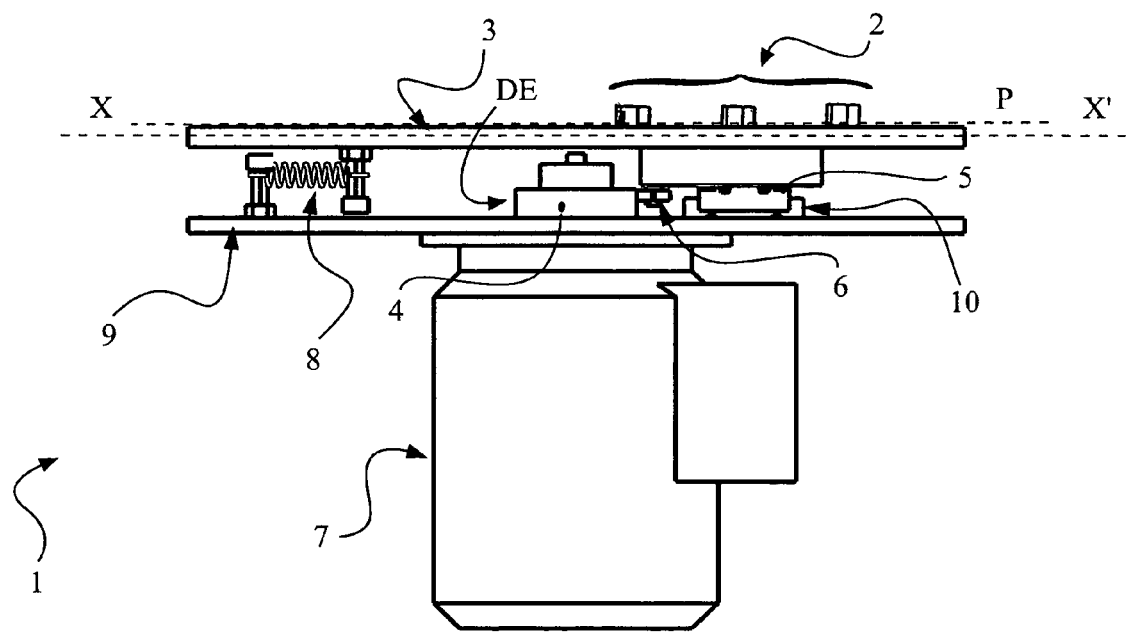
FIG. 2b illustrates the device for transporting parts in frontal view.

A device for transporting parts 1 transports parts 2 to supply a machine tool or other appliance within the framework of an industrial process. It comprises a transporting member 3 on which the parts to be transported 2 are arranged, which member moves the parts in a plane (P) in which they are located so as to displace them relative to said member.

The transporting member 3 is mobile relative to the frame of the device to be put into motion in the plane (P) by a driving device (DE) comprising at least one cam 4. The movement of the transporting member 3 occurs only in the plane (P) in which the parts 2 are displaced. Thus, the parts 2 are displaced on the transporting member 3 by sliding at the moment when said member moves.

According to the first embodiment of the device illustrated in FIGS. 1 to 5, the transporting member 3 is beneficially composed of a longitudinal rail whose movement in the plane (P) is a reciprocating translational movement generated by the rotation of the drive cam 4. Said reciprocating translational movement of the rail 3 provokes sliding displacement of the parts 2 along the rail thanks to the particular configuration of the mechanical parameters (acceleration, speed) of the alternating movement, obtained thanks to the drive cam 4 and the physical parameters of the constitutive elements (friction coefficient). It should be noted that such device could utilize a different transporting member energized by another type of movement.

Thus, according to a non-represented embodiment, the movement of the transporting member is a movement of alternative rotation. It is accordingly beneficially composed of a rail having round, circular or spiral shape, which is energized by rotational alternative movement of reduced amplitude, said movement being generated by the rotation of a drive cam similar to that of the first embodiment, which co-operates with an incline which is an integral part of a circular rail support hinged around a fixed axis.

Figure 3:
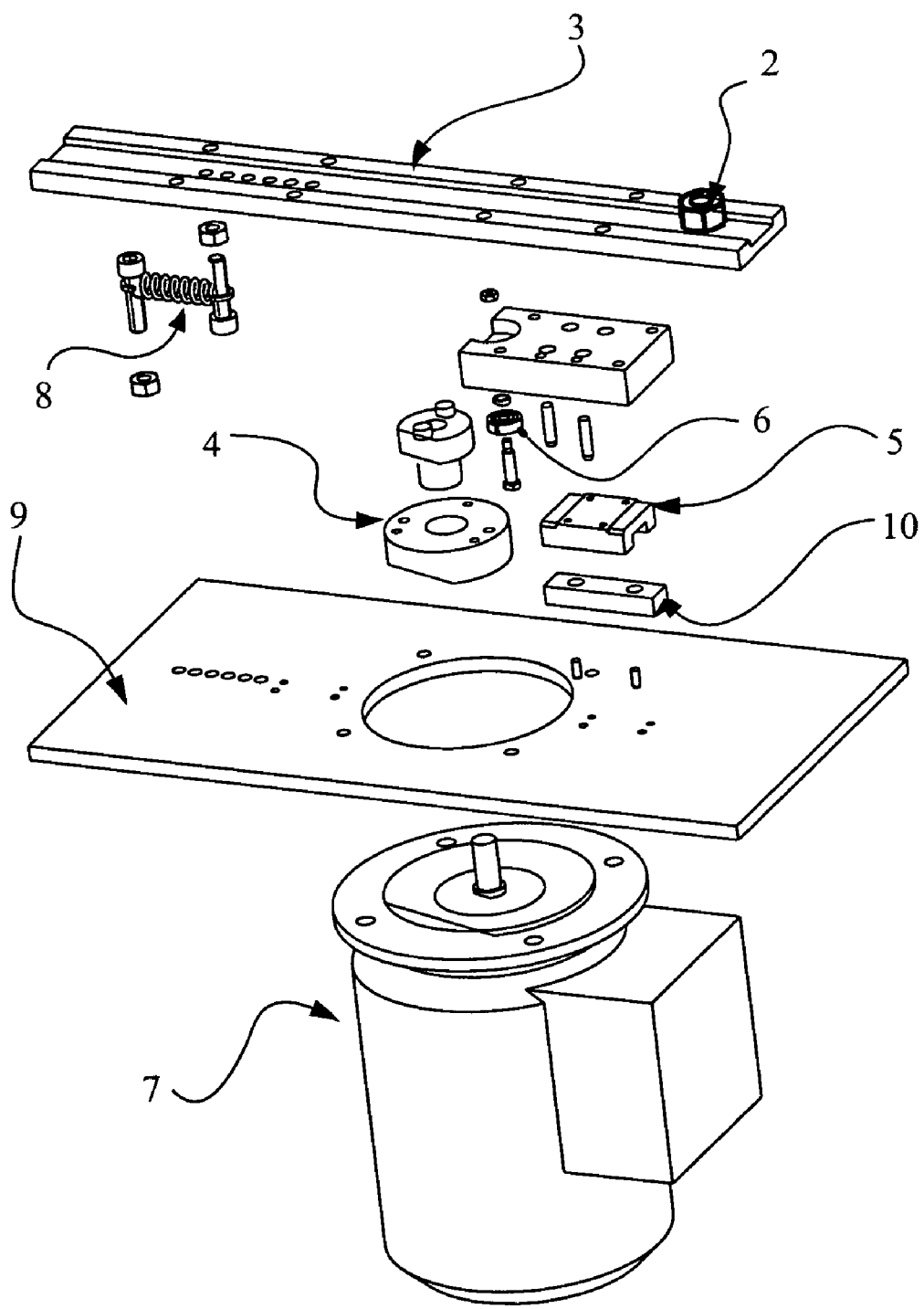
Figure 4:
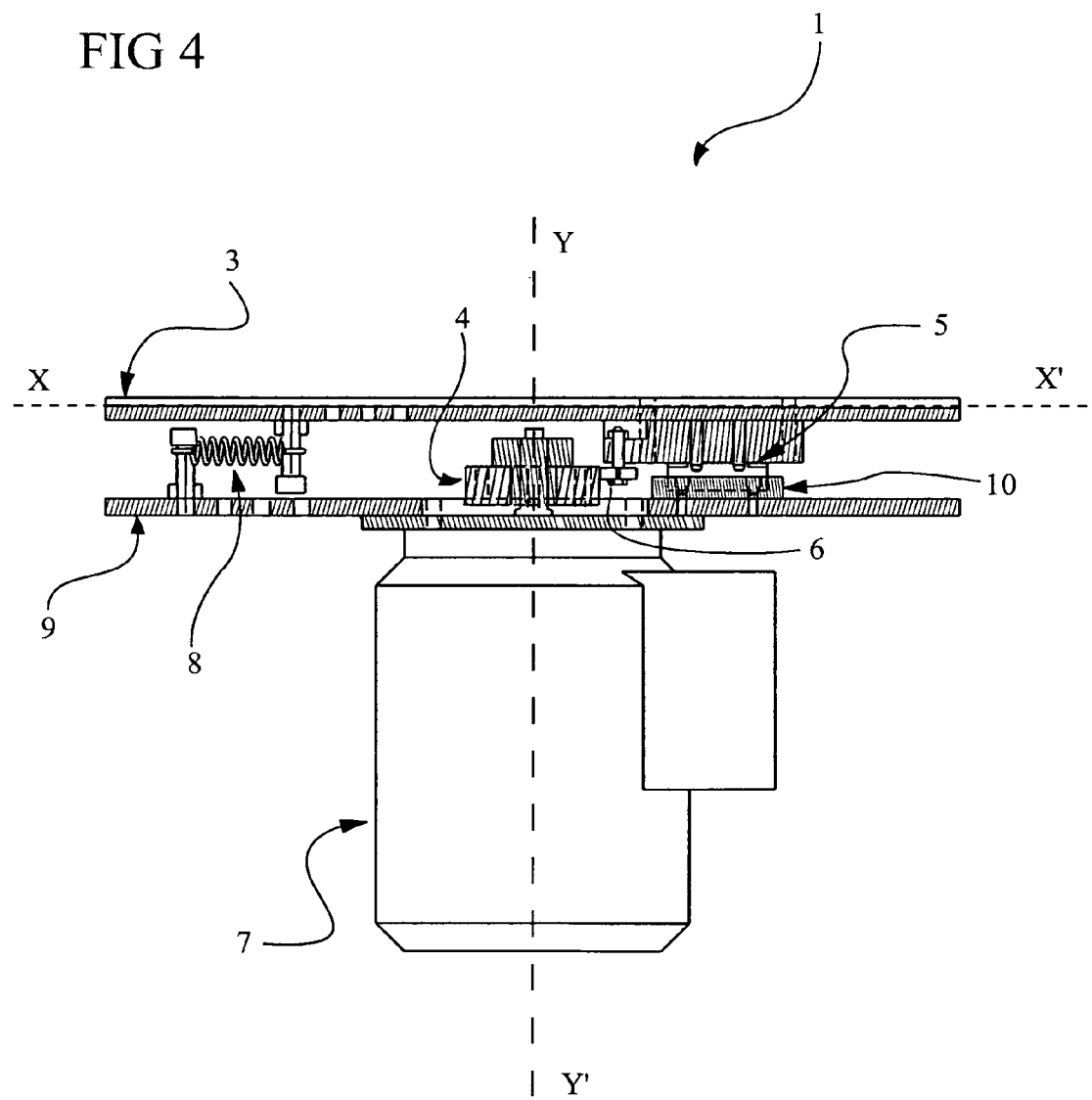

According to the first embodiment of the device for transporting parts 1, the transporting rail 3 on which the parts 2 are arranged to be transported is carried by a rail support 5 which carries a roller 6. Said roller 6 is installed on the support 5 so as to be able to drive in translation according to the longitudinal axis (XX') when it cooperates with the rotating cam 4 as is indicated in FIGS. 1, 3 and 4.

The device for transporting parts 1 comprises a motorized device 7 which drives the cam 4 to rotate around its axis of revolution (YY'). The rotation of the cam 4 provokes—thanks to its specific shape—the alternative longitudinal displacement of the rail support 5 while cooperating with the roller 6. It should be noted that the axes of rotation of the cam and the roller are parallel, thus reducing wear and tear due to friction at time of their cooperation.

It goes without saying that the device could present a different configuration with respect to cooperation of the cam and the rail support. The axis of rotation of the cam could be positioned differently, while the latter would operate on a sloping plane of the support and no longer on a roller, for example.

According to the embodiment illustrated in FIGS. 1 to 6 of the supply device of parts 1, said device comprises compensation or biasing means intended to act upon the roller 6 in order to maintain permanent contact with the cam 4 so that the alternating movement of the rail 3 corresponds exactly to the involute curve of the surface in contact with the cam 4. These compensation means can be of several kinds, such as formed by a traction spring 8. It should be noted that this spring 8 can act directly between the frame 9 on which the motor 7 is fixed and the rail 3, while the rail support 5 is mounted in sliding fashion on a guide 10 of the frame in order to be able to act on the cam 4 via the intermediary of the transporting rail 3 and the spring 8. It should be noted that the cooperation of the rail support 5 with the guide 10 could be realized very simply by two lateral flexible sheets which would secure the connection between the frame 9 and the vibrating rail 3.

In the device for supply of parts 1, the rail 3 is mounted in sliding fashion on the frame 9 via the intermediary of its support 5 and guide 10. Its movement in the plane (P) is a translational movement, the accelerations and slow-downs of which are exclusively controlled by the slope of the external surface or the contact surface of the drive cam 4.

Figure 6:
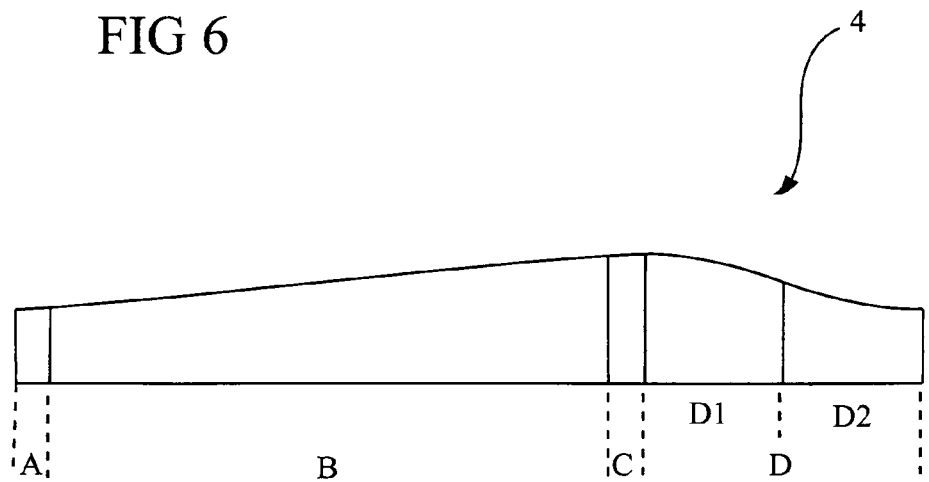
Figure 7:
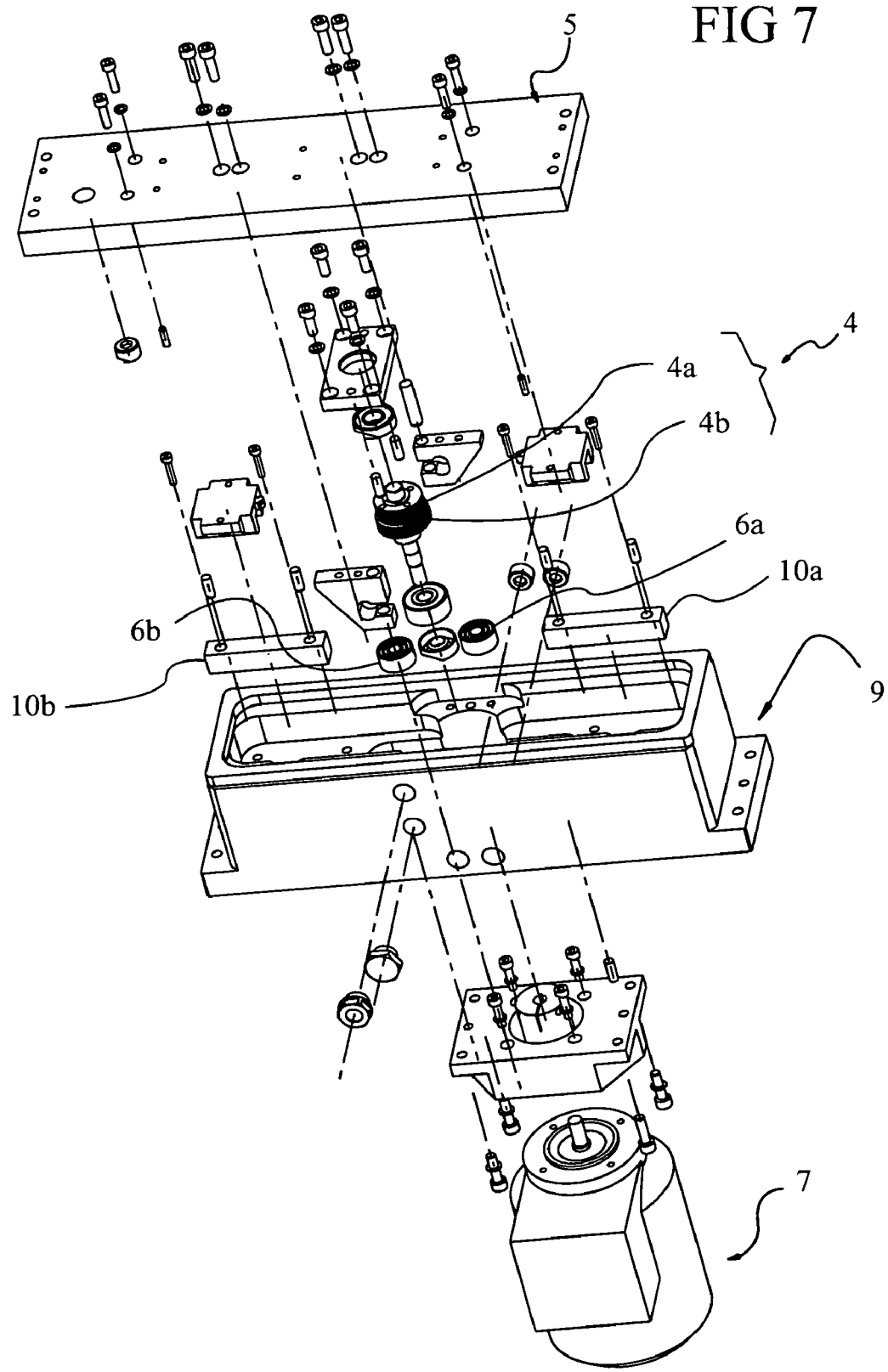
FIGS. 7 to 10 illustrate a second embodiment.
Figure 8:
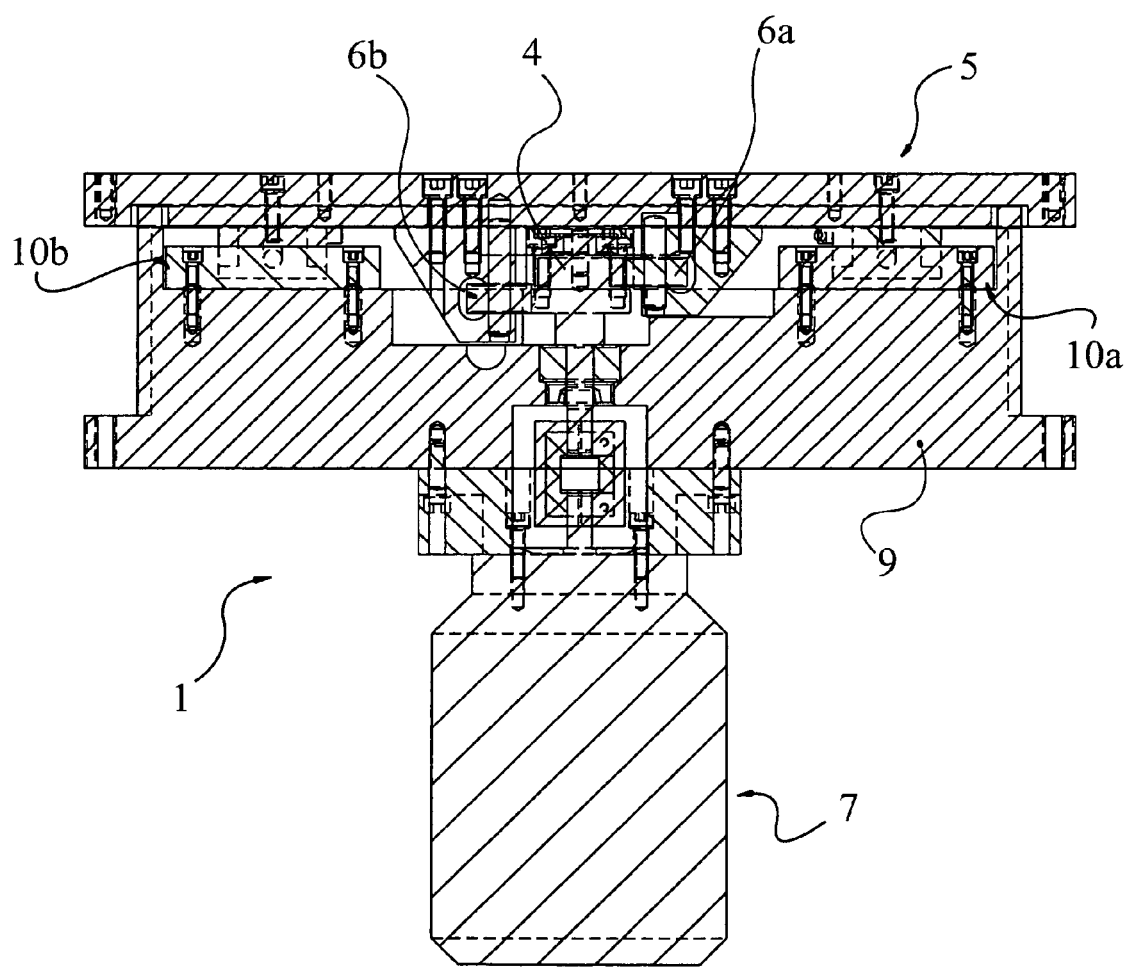
Figure 9:
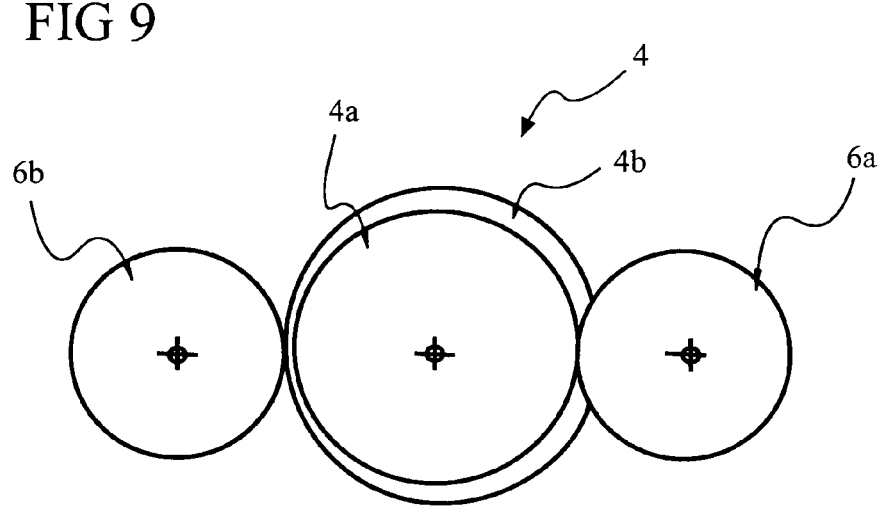
Figure 10:
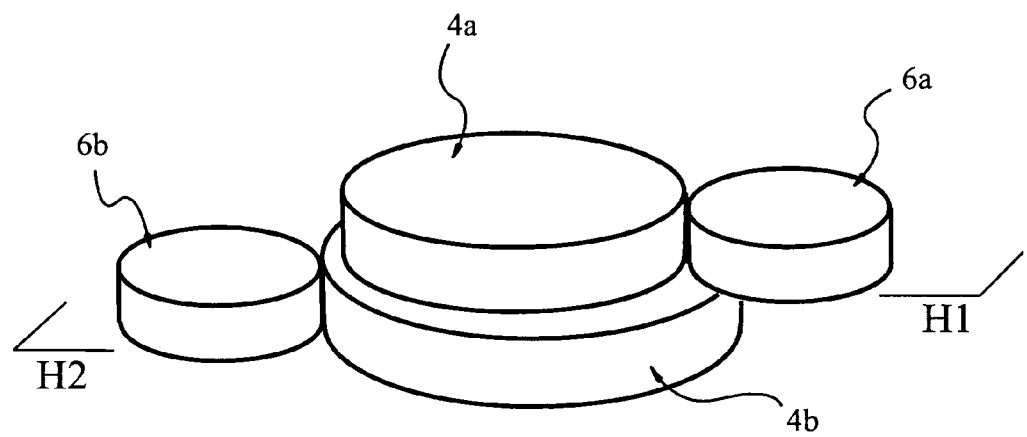

According to the illustrated embodiment, the drive cam 4 presents an involute surface curve such as is illustrated in FIG. 6. Starting from an initial 0° point at the far let of FIG. 6, it comprises a first zone (A) called the acceleration zone, which is very short, representing an angular segment of less than 20°, followed by a forward movement or advancement zone (B) in which the rail 3 moves at constant speed, with the radius of the drive cam increasing in somewhat constant fashion over an angular segment approximately equal to 220°, in a manner so that the rail moves with low to zero acceleration. It then comprises a short deceleration zone (C), the angular segment of which is less than 20°, in front of a zone called "recoil" or "draw-back" zone (D) the draw-back occurs with strong acceleration during the first half of the angular segment (D1), and with some slowing down in a second portion (D2), before returning to the initial 0° point of the drive cam. It can thus be stated that the forward movement of the rail corresponding to zones (A, B, C) represents an angular segment of the drive cam ranging between 200° and 300°; whereas the "draw-back" zone (D) comprises between 60° and 160°. According to the preferred embodiment of the transporting device, the group of zones (A, B, C) represent an angular segment of more than 240°.

When the drive cam travels one complete turn, the roller 6 and the rail 3 undergo movement in forward direction corresponding to zones (A, B, C) of the drive cam during approximately two thirds of the turn, then a more rapid draw-back movement during the last third of the turn. Said movement of the rail permits,—thanks to the acceleration zone (A)—rapid attainment of relative movement rate (with respect to the frame) of parts 2 and to again accelerate before moving at constant speed during the deceleration zone (C), then the draw-back (zone D) of the rail which occurs quickly before restarting the cycle. It should be noted that the slopes of the contact surface of the drive cam are specifically calculated so that when the rail 3 retreats, which occurs quite suddenly, the parts 2 continue to move forward at relative speed with respect to the frame, prior to being recovered by the rail in the acceleration zone (A) at the moment when it attains their speed.

Figure 5:
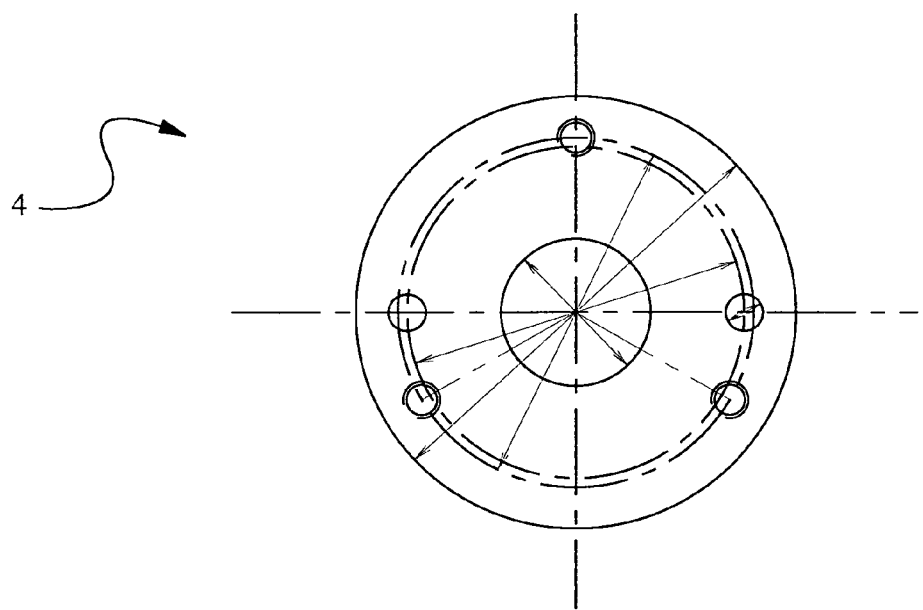

It should be noted, as indicated in FIG. 5, that the drive cam has holes for passage of pins, said pins permitting the exact placement of said drive cam on the machine tool with exact and reproducible positioning of the reference line or point 0 of the drive cam. Said drive cam can, furthermore, be installed on the motorized device, in detachable fashion, in order to be interchangeable, thus permitting, for example, the adaptation of the transporting device to different pieces and to different constraints of the machines to be supplied.

FIGS. 7 to 10 represent a second specific embodiment of the invention.

With respect to this second embodiment, for reasons of clarity, identical reference numbers have been designated for the same elements as were used in the first embodiment and when viewing the figures for the second embodiment the reader can readily refer to the description given for the first specific embodiment.

According to the second embodiment, the spring 8 of the compensation means of the first specific embodiment, for maintaining the roller 6 in contact with the drive cam 4 has been replaced by a structure of two rollers 6a, 6b and two cams 4a, 4b.

Accordingly, the cam 4 is composed of two superposed cams, specifically, a first cam or upper cam 4a and a second cam or lower cam 4b. The two cams 4a and 4b are preferably integral and mounted on the motor exit shaft 7.

Furthermore, the rail support 5 carries two rollers 6a, 6b intended to cooperate with the cams 4a, 4b, i.e., a first roller 6a which cooperates with the first cam 4a and a second roller 6b which cooperates with the second cam 4b. Consequently, the two rollers are arranged on both sides of the two cams and plane (P) goes through the center of the rollers passes through the pivoting axis (Y,Y') of the two cams. The general horizontal plane (H1) of the first roller is arranged in the general horizontal plane of the first cam, while the general horizontal plane (H2) of the second roller is arranged in the general horizontal plane of the second cam. The general horizontal plane (H1) of the first roller and thus the general horizontal plane of the first cam is located above the general horizontal plane (H2) of the second roller and thus the general horizontal plane of the second cam.

It is therefore obvious that the 2-cam unit is sandwiched between the two rollers, which permits assurance of displacement in two directions of the rail support without the spring system as provided in the first specific embodiment. Thanks to the two-roller device, acceleration is controlled and the inertia of the moving parts has no detrimental effect. And, this occurs without interfering friction, which can produce a somewhat stiff spring.

In addition, it should be noted that the motored device which permits turning of the cam can beneficially function in both directions. Thus, when the drive cam turns in one direction, the parts move forward, whereas reversal of the direction of rotation of the cam brings about retreat of the parts. It should also be noted that the motorized device can beneficially permit regulation of the speed of rotation of the cam.

It should likewise be noted that the rail can be covered with a facing, the friction coefficient of which is adapted to the range of parts it is intended to transport.

Needless to say, the invention is not limited to the specific embodiment, described and presented by way of example, but it also includes all equivalent techniques as well as combinations thereof.

The invention claimed is:

1. A device for transporting parts comprising:
   a transporting member on which the parts are transported, said transporting member being movably mounted relative to a frame of the device for reciprocating movement along a plane, in which the parts are transported;
   a driving device for driving the transporting member with the reciprocating movement, the driving device including:
      at least one drive cam,
      at least one roller mounted to the transporting member and cooperating with the drive cam, the axis of rotation of the cam and an axis of rotation of the roller being parallel,
      so that the movement in the plane is a reciprocating translational movement generated by the rotation of the drive cam,
      a motorized device which drives the cam to rotate around an axis of revolution, said rotation of the cam having a contact surface configured to cause alternative longitudinal displacement of a rail support in cooperation with the roller, the transporting member being connected with the rail such that movement of the rail in the plane includes alternating movement along the plane caused by rotation of the drive cam, and
      wherein the cam contact surface presents an involute surface curve which includes an acceleration zone, then an advancement zone in which a radius of the cam increases in constant, linear fashion, a declaration zone, and a zone called the "draw-back zone" in which the radius diminishes; and
      wherein the transporting member moves forward when the roller contacts the acceleration, advancement, and deceleration zones, which zones span an angular segment of the cam ranging between 200° and 300° and the draw-back zone spans an angular segment ranging between 60° and 160°.

2. The device for transporting parts according to claim 1, further including:
   a compensating means for causing the roller to maintain contact with the cam contact surface.

3. The device for transporting parts according to claim 1, wherein when the cam travels one full turn, the roller and thus the transporting member undergo a forward movement from an initial position corresponding to the acceleration, advancement, and deceleration zones of the cam contact surface, during approximately two thirds of the turn, then a more abrupt reverse movement corresponding to the draw-back zone during the last third of the turn, during the acceleration zone accelerating the parts to a displacement speed, advancing the parts constantly at the displacement speed during the advancement zone, and allowing the parts to slide during the deceleration zone, then the draw-backzone quickly returns the transport member to the initial position to re-start the cycle.

4. The device for transporting parts according to claim 1, wherein the motorized device rotates the cam in one direction to move the parts forward along the transport member, and rotates the cam in an opposite direction to move the parts rearward along the transport member.

5. The device for transporting parts according to claim 1, wherein the cam is sandwiched between two rollers.

6. The device for transporting parts according to claim 5, wherein the cam is composed of two superposed cams including an upper cam which cooperates with a first of the two rollers and a lower cam which cooperates with a second of the two rollers.

7. The device for transporting parts according to claim 1, wherein the said driving device further includes:
   compensation means configured to act upon the roller in order to maintain permanent contact with the cam contact surface such that the alternating movement of the rail corresponds exactly to the involute curve of the contact surface presented by the cam.

8. The device for transporting parts according to claim 7, wherein the compensation means includes a spring.

9. A reciprocating feeder for transporting parts, the reciprocating feeder comprising:
   a longitudinally elongated transport member;
   a mounting structure for mounting the transporting member on a frame for longitudinal reciprocating motion in a plane;
   at least one roller mounted for longitudinal movement with the transporting member;
   an eccentric cam mounted on a rotary drive which is connected with the frame, the cam being mounted to engage the roller and urge the roller along the plane of the longitudinal reciprocating movement, the cam lying in a plane parallel to the plane of longitudinal reciprocating movement, the cam having an involute surface including:
      an acceleration zone of increasing radius spanning an angular segment of less than 20° which accelerates the transport member in a first direction along the plane,
      a forward movement zone of constant increasing radius spanning an angular segment between 200° and 260° which moves the transport member in the first direction at a constant speed without acceleration,
      a deceleration zone spanning an angular segment of less than 20° which decelerates movement of the transport member in the first direction,
      a "draw-back zone" with decreasing radius, the draw-back zone including a first draw-back zone portion and a second draw-back zone portion, which draw-back zone moves the transfer member in the second direction, the draw-back zone spanning an angular segment between 60° and 160°;
   a compensating means for maintaining the roller in contact with the eccentric cam involute surface and moving the transporting member in the second direction along the plane of longitudinal reciprocating movement.

10. The feeder according to claim 9, wherein the compensating means includes one of a spring, a second roller, and a second roller and cam assembly.

* * * * *